(12) United States Patent
Vajravel

(10) Patent No.: US 10,691,630 B2
(45) Date of Patent: Jun. 23, 2020

(54) STATE-BASED IRP MANAGEMENT FOR REDIRECTED DEVICE

(71) Applicant: Wyse Technology L.L.C., Santa Clara, CA (US)

(72) Inventor: Gokul Thiruchengode Vajravel, Bangalore (IN)

(73) Assignee: Wyse Technology L.L.C., Santa Clara, CA (US)

( * ) Notice: Subject to any disclaimer, the term of this patent is extended or adjusted under 35 U.S.C. 154(b) by 290 days.

(21) Appl. No.: 15/410,917

(22) Filed: Jan. 20, 2017

(65) Prior Publication Data

US 2018/0210855 A1    Jul. 26, 2018

(51) Int. Cl.
*G06F 13/40* (2006.01)
*G06F 13/42* (2006.01)
*H04L 29/06* (2006.01)

(52) U.S. Cl.
CPC ...... *G06F 13/4072* (2013.01); *G06F 13/4282* (2013.01); *H04L 67/38* (2013.01)

(58) Field of Classification Search
CPC .............. G06F 13/102; G06F 13/4282; G06F 2009/45579; G06F 2213/0042; G06F 9/547; G06F 13/4072; G06F 9/4411; H04L 67/40; H04L 67/42

USPC ......................................................... 709/203
See application file for complete search history.

(56) References Cited

U.S. PATENT DOCUMENTS

| | | | |
|---|---|---|---|
| 6,178,464 B1 * | 1/2001 | Knight .................. | G06F 9/4484 719/328 |
| 6,549,934 B1 * | 4/2003 | Peterson ................. | H04L 49/90 709/203 |
| 2002/0078250 A1 * | 6/2002 | Murching ............... | H04L 29/06 719/310 |
| 2018/0217948 A1 * | 8/2018 | Li ....................... | G06F 9/45558 |

* cited by examiner

*Primary Examiner* — Tan Doan
(74) *Attorney, Agent, or Firm* — Kirton McConkie; Brian Tucker

(57) ABSTRACT

State-based I/O management is provided. A virtual bus driver of a virtual desktop infrastructure can employ containers to manage the state of an IRP that pertains to a redirected device. When an IRP that has been shared to a client terminal is cancelled, the virtual bus driver can update the state of a container associated with the IRP to prevent the IRP from being completed twice. In this way, devices for which IRPs are frequently cancelled can be redirected without concern that a cancelled IRP may result in improper system performance or a crash.

20 Claims, 12 Drawing Sheets

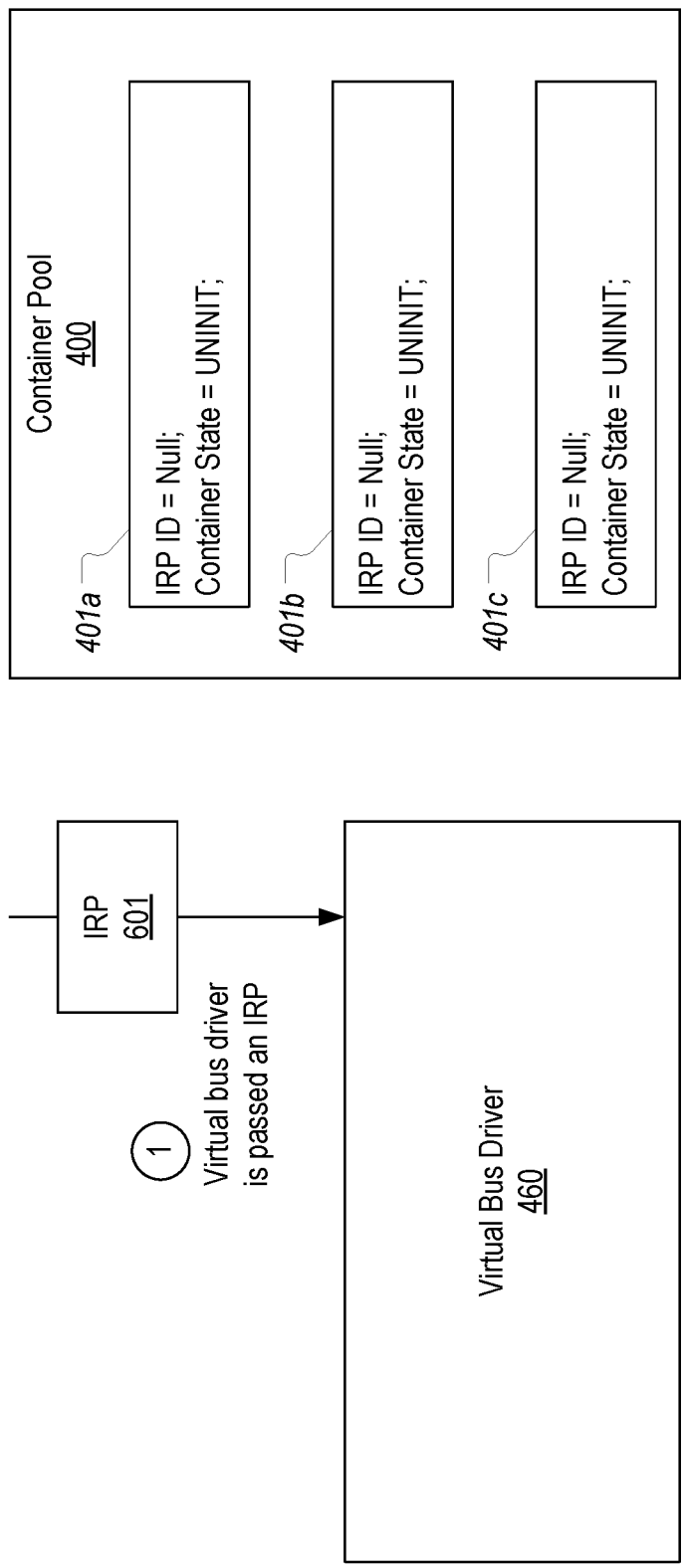

STATE-BASED IRP MANAGEMENT FOR REDIRECTED DEVICE

CROSS-REFERENCE TO RELATED APPLICATIONS

N/A

BACKGROUND

The present invention is generally directed to device redirection in a virtual desktop infrastructure (VDI) environment. Device redirection generally refers to making a device that is connected to a client accessible within a virtual desktop as if the device had been physically connected to the virtual desktop. In other words, when device redirection is implemented, a user can connect a device to his or her client terminal and the device will function as if it had been connected to the server. Device redirection will primarily be described in the context of a USB device. However, it is also possible to redirect non-USB devices.

FIGS. 1 and 2 and the following description will provide a general overview of how USB device redirection can be implemented in accordance with some embodiments of the present invention. In FIG. 1, a computing system 100 is depicted as including a number of client terminals 102a-102n (referenced generally herein as client(s) 102) in communication with a server 104 via a network 106. Server 104 can be configured to support a remote session (e.g., a remote desktop session) wherein a user at a client 102 can remotely access applications and data at the server 104 from the client 102. Such a connection may be established using any of several well-known techniques such as the Remote Desktop Protocol (RDP) and the Citrix® Independent Computing Architecture (ICA).

Client terminal 102 may represent a computer, a mobile phone (e.g., smart phone), a laptop computer, a thin client terminal, a personal digital assistant (PDA), a portable computing terminal, or a suitable terminal or device with a processor. Server 104 may represent a computer, a laptop computer, a computing terminal, a virtual machine (e.g., VMware® Virtual Machine), a desktop session (e.g., Microsoft Terminal Server), a published application (e.g., Microsoft Terminal Server) or a suitable terminal with a processor.

Client 102 may initiate a remote session with server 104 by sending a request for remote access and credentials (e.g., login name and password) to server 104. If server 104 accepts the credentials from client 102, then server 104 may establish a remote session, which allows a user at client 102 to access applications and data at server 104. During the remote session, server 104 sends display data to client 102 over network 106, which may include display data of a desktop and/or one or more applications running on server 104. The desktop may include, for example, icons corresponding to different applications that can be launched on server 104. The display data allows client 102 to locally display the desktop and/or applications running on server 104.

During the remote session, client 102 may send user commands (e.g., inputted via a mouse or keyboard at client 102) to server 104 over network 106. Server 104 may process the user commands from client 102 similar to user commands received from an input device that is local to server 104. For example, if the user commands include mouse movements, then server 104 may move a pointer on the desktop running on server 104 accordingly. When the display data of the desktop and/or application changes in response to the user commands, server 104 sends the updated display data to client 102. Client 102 locally displays the updated display data so that the user at client 102 can view changes at server 104 in response to the user commands. Together, these aspects allow the user at client 102 to locally view and input commands to the desktop and/or application that is running remotely on server 104. From the perspective of the client side, the desktop running on server 104 may represent a virtual desktop environment.

FIG. 2 is a block diagram of a local device virtualization system 200 in accordance with embodiments of the present invention. System 200 may include client 102 in communication with server 104 over network 106 as illustrated in FIG. 1. Client 102 may include a proxy 210, a stub driver 220, and a bus driver 230. Client 102 can be connected to a device 240, as shown in FIG. 2. Server 104 may include an agent 250 and a virtual bus driver 260.

In accordance with USB device redirection techniques, while device 240 is not locally or physically connected to server 104 and is remote to server 104, device 240 appears to server 104 as if it is locally connected to server 104, as discussed further below. Thus, device 240 appears to server 104 as a virtual device 290.

By way of illustration and not limitation, device 240 may be any type of USB device including a machine-readable storage medium (e.g., flash storage device), a printer, a scanner, a camera, a facsimile machine, a phone, an audio device (e.g., a headset), a video device (e.g., a camera), a peripheral device, or other suitable device that can be connected to client 102. Device 240 may be an external device (i.e., external to client 102) or an internal device (i.e., internal to client 102).

Bus driver 230 can be configured to allow the operating system and programs of client 102 to interact with device 240. In one aspect, when device 240 is connected to client 102 (e.g., plugged into a port of client 102), bus driver 230 may detect the presence of device 240 and read information regarding device 240 ("device information") from device 240. The device information may include features, characteristics and other information specific to device 240 such as a device descriptor (e.g., product ID, vendor ID and/or other information), a configuration descriptor, an interface descriptor, an endpoint descriptor and/or a string descriptor. Bus driver 230 may communicate with device 240 through a computer bus or other wired or wireless communications interface.

In accordance with USB device redirection techniques, device 240 may be accessed from server 104 as if the device were connected locally to server 240. Device 240 may be accessed from server 104 when client 102 is connected to server 104 through a user session running on server 104. For example, device 240 may be accessible from the desktop running on server 104 (i.e., virtual desktop environment). To enable this, bus driver 230 may be configured to load stub driver 220 as the default driver for device 240. Stub driver 220 may be configured to report the presence of device 240 to proxy 210 and to provide the device information (e.g., device descriptor) to proxy 210. Proxy 210 may be configured to report the presence of device 240, along with the device information, to agent 250 of server 104 over network 106. Thus, stub driver 220 redirects device 240 to server 104 via proxy 210.

Agent 250 may be configured to receive the report from proxy 210 that device 240 is connected to client 102 and the device information. Agent 250 may further be configured to associate with the report from proxy 210 one or more identifiers for client 102 and/or for a user session through which client 102 is connected to server 104, such as a session number or a session locally unique identifier (LUID). Agent 250 can provide notification of device 240, along with the device information, to virtual bus driver 260. Virtual bus driver 260 (which may be a TCX USB bus driver, or any other bus driver) may be configured to create and store in memory a record corresponding to device 240, the record including at least part of the device information and session identifiers received from agent 250. Virtual bus driver 260 may be configured to report to operating system 170 of server 104 that device 240 is connected and to provide the device information to the operating system. This allows the operating system of server 104 to recognize the presence of device 240 even though device 240 is connected to client 102.

The operating system of server 104 may use the device information to find and load one or more appropriate device drivers for device 240 at server 104. Each driver may have an associated device object (object(s) 281a, 281b, . . . , 281n, referred to generally as device object(s) 281), as illustratively shown in FIG. 2. A device object 281 is a software implementation of a real device 240 or a virtualized (or conceptual) device 290. Different device objects 281 layer over each other to provide the complete functionality. The different device objects 281 are associated with different device drivers (driver(s) 282a, 282b, . . . 282n, referred to generally as device driver(s) 282). In an example, a device 240 such as a USB flash drive may have associated device objects including objects corresponding to a USB driver, a storage driver, a volume manager driver, and a file system driver for the device. The device objects 281 corresponding to a same device 240 form a layered device stack 280 for device 240. For example, for a USB device, a USB bus driver will create a device object 281a stating that a new device has been plugged in. Next, a plug-and-play (PNP) component of the operating system will search for and load the best driver for device 240, which will create another device object 281b that is layered over the previous device object 281a. The layering of device objects 281 will create device stack 280.

Device objects 281 may be stored in a memory of the server 104 associated with virtual bus driver 260. In particular, device objects 281 and resulting device stack 280 may be stored in random-access memory of server 104. Different devices 240/290 can have device stacks having different device objects and different numbers of device objects. The device stack may be ordered, such that lower level device objects (corresponding to lower level device drivers) have lower numbers than higher level device objects (corresponding to higher level device drivers). The device stack may be traversed downwards by traversing the stack from higher level objects to lower level objects. For example, in the case of an illustrative device stack 280 corresponding to a USB flash drive, the ordered device stack may be traversed downwards from a high-level file system driver device object, to a volume manager driver device object, to a storage driver device object, to a USB driver device object, and finally to a low-level virtual bus driver device object. Different device stacks 280 can be layered over each other to provide the functionality of the devices 240/290 inside devices, like USB Headsets, or USB pen drives. A USB pen drive, for example, can create a USB device stack first, over which it can create a storage device stack, where each of the device stacks have two or more device objects.

Once one or more device object(s) 281 are loaded by operating system 170 of server 104, each device object 281 can create a symbolic link (also referred to as a "device interface") to device object 281 and associated device driver 282. The symbolic link is used by applications running on server 104 to access device object 281 and device 240/290. The symbolic link can be created by a call to a function such as IoCreateSymbolicLink( ) including such arguments as a name for the symbolic link, and a name of device object 281 or associated device 240. In one example, for example, a symbolic link to a USB flash drive device 240 is created by a call from a device object 281 for device 240 to the function IoCreateSymbolicLink( ) including arguments "\\GLOBAL??\C:" (i.e., the name for the symbolic link) and "\Device\HarddiskVolume1" (i.e., a name of the device object).

The creation of a symbolic link results in an entry being created in an object manager namespace (OMN) of operating system 170. The OMN stores information on symbolic links created for and used by operating system 170, including symbolic links for devices 240, virtualized devices 290, and applications 270 running on server 104.

As a result of the symbolic link creation process, a symbolic link to device 240 is enumerated in the OMN of server 104. Once the presence of device 240 is reported to operating system 170 of server 104, device 240 may be accessible from a user session (and associated desktop) running on server 104 (i.e., virtual desktop environment). For example, device 240 may appear as an icon on the virtual desktop environment and/or may be accessed by applications running on server 104.

An application 270 running on server 104 may access device 240 by sending a transaction request including the symbolic link for device 240 to operating system 170. Operating system 170 may consult the Object Manager Namespace to retrieve an address or other identifier for the device itself 240 or for a device object 281 associated with device 240. Using the retrieved address or identifier, operating system 170 forwards the transaction request for device 240 either directly, through a device object 281 of device stack 280, and/or through virtual bus driver 260. Virtual bus driver 260 may direct the transaction request to agent 250, which sends the transaction request to proxy 210 over network 106. Proxy 210 receives the transaction request from agent 250, and directs the received transaction request to stub driver 220. Stub driver 220 then directs the transaction request to device 240 through bus driver 230.

Bus driver 230 receives the result of the transaction request from device 240 and sends the result of the transaction request to stub driver 220. Stub driver 220 directs the result of the transaction request to proxy 210, which sends the result of the transaction request to agent 250 over network 106. Agent 250 directs the result of the transaction request to virtual bus driver 260. Virtual bus driver 260 then directs the result of the transaction request to application 270 either directly or through a device object 281 of device stack 280.

Thus, virtual bus driver 260 may receive transaction requests for device 240 from application 270 and send results of the transaction requests back to application 270 (either directly or through a device object 281 of device stack 280). As such, application 270 may interact with virtual bus driver 260 in the same way as with a bus driver for a device that is connected locally to server 104. Virtual bus driver 260 may hide the fact that it sends transaction requests to agent 250 and receives the results of the transaction requests from agent 250 instead of a device that is connected locally to server 104. As a result, device 240 connected to client 102 may appear to application 270 as if the physical device 240 is connected locally to server 104.

FIG. 3 generally illustrates how an application executing on server 104 can access redirected device 240. As shown, when application 270 desires to access device 240, it can send an IO request 301 (which can represent any of a number of different types of IO requests) to operating system 170. Operating system 170 (or more specifically the IO manager of the operating system) receives IO request 301 and generates an appropriate IO request packet (IRP) 301a.

Because IO request 301 is directed to device 240, operating system 170 will then route IRP 301a to device stack 280 (e.g., by calling IoCallDriver with a pointer to the IRP and a pointer to a device object in device stack 280 (e.g., Object n 281n shown in FIG. 2)). Because device stack 280 pertains to a USB device, the driver(s) in the device stack will create a USB request block (URB) (not shown) and associate it with IRP 301a. The driver(s) may also perform different types of processing on IRP 301a including blocking, fulfilling, or otherwise completing the processing of the IRP. However, for purposes of this example, it will be assumed that the driver(s) in device stack 280 ultimately pass IRP 301a down to virtual bus driver 260.

Virtual bus driver 260 will then extract sufficient information from IRP 301a to allow an equivalent IRP to be created by stub driver 220 on client terminal 102 and send this IRP information 301b to agent 250. Alternatively, agent 250 could perform this extraction. In any case, an equivalent IRP will be created on client terminal 102 to which device 240 will provide an appropriate response. The content of this response can then be routed back to virtual bus driver 260 via agent 250 which will then update the actual IRP 301a appropriately and direct the IRP back up device stack 280 for completion.

Because IRPs bound for a particular device can be generated faster than the device can process them, it is necessary for the lowest-level driver to provide some type of IRP queuing mechanism. For example, a driver may implement its own IRP queue or may employ a system-supplied IRP queue. Because virtual bus driver 260 functions as the lowest-level driver on server 104 for a redirected USB device, it is therefore necessary that virtual bus driver 260 provide for IRP queueing.

Also, drivers that queue IRPs should provide a cancel routine by which a particular IRP or set of IRPs can be cancelled. For example, whenever a thread exits without completing, operating system 170 will cancel any unprocessed IRPs that the thread initiated. Operating system 170 may also cancel any IRP that has not been completed within a specified amount of time (e.g., five minutes). Also, a driver can cancel any IRP that it has created.

Whenever a driver receives a request to cancel an IRP, the driver should complete the IRP as quickly as possible while still maintaining system integrity. However, in device redirection scenarios, this can be a difficult requirement to meet. For example, due to the high latency of the network over which the device may be redirected, a number of potential race conditions may exist such as when virtual bus driver 260 receives a request to cancel an IRP after the IRP has been sent on to client terminal 102 but before client terminal 102 has returned a response. In such a situation, if virtual bus driver 260 were to immediately cancel the IRP on the server side (e.g., by calling IoCompleteRequest), it would then need to provide some mechanism for identifying and handling any response to the now-canceled IRP that it receives from client terminal 102. Otherwise, virtual bus driver 260 may cause the IRP to be completed twice which can result in system instability or even a crash. Providing this type of mechanism within virtual bus driver 260 can greatly increase its complexity and may adversely affect system performance, particularly in high latency networks.

The Windows operating system provides a mechanism, known as cancel-safe queues, which a driver can employ to address race conditions that may occur when an IRP is cancelled. Unfortunately, these cancel-safe queues have limitations that make them unsuitable for use by virtual bus driver 260 in many device redirection scenarios. For example, virtual bus driver 260 can only use a cancel-safe queue for IRPs that it originates. But, most IRPs that virtual bus driver 260 handles originate at higher level drivers therefore preventing virtual bus driver 260 from using a cancel-safe queue for such IRPs. Additionally, a cancel-safe queue cannot be shared between server 104 and client terminal 102.

Because of the difficulties associated with allowing IRPs to be cancelled, current VDI providers do not enable redirection of many types of USB devices (or at least discourage redirection of such devices), but instead employ driver mapping techniques to make these devices available on the server. This is particularly true of time-sensitive devices such as COM/serial port devices, scanners, and NFC readers for which IRPs are cancelled if not completed on time.

BRIEF SUMMARY

The present invention extends to methods, systems, and computer program products for implementing state-based I/O management. A virtual bus driver of a virtual desktop infrastructure can employ containers to manage the state of an IRP that pertains to a redirected device. When an IRP that has been shared to a client terminal is cancelled, the virtual bus driver can update the state of a container associated with the IRP to prevent the IRP from being completed twice. In this way, devices for which IRPs are frequently cancelled can be redirected without concern that a cancelled IRP may result in improper system performance or a crash.

In one embodiment, the present invention is implemented as a method, performed by a virtual bus driver, for managing IRPs that pertain to a device that is redirected to a server in a virtual desktop infrastructure environment. The virtual bus driver receives a first IRP that pertains to a device that is connected to a client terminal and redirected to the server. The virtual bus driver associates the first IRP with a first container and transitions the first container to an initialized state. The virtual bus driver shares the first IRP to the client terminal. In conjunction with sharing the first IRP to the client terminal, the virtual bus driver transitions the first container to a shared state. Prior to receiving notification from the client terminal that the first IRP has been completed, the virtual bus driver receives a server-side request to cancel the first IRP, and in response, transitions the first container to an uninitialized state.

In another embodiment, the present invention is implemented as a method, performed by a virtual bus driver, for managing IRPs that pertain to a device that is redirected to a server in a virtual desktop infrastructure environment. The virtual bus driver receives a first IRP that pertains to a device that is connected to a client terminal and redirected to the server, associates the first IRP with a first container, and transitions the first container to an initialized state. The virtual bus driver then shares the first IRP to the client terminal. In conjunction with sharing the first IRP to the client terminal, the virtual bus driver transitions the first container to a shared state. In response to receiving notification from the client terminal that the first IRP has been completed, the virtual bus driver determines that the first container is in the shared state and then completes the first IRP on the server.

In another embodiment, the present invention is implemented as a virtual desktop infrastructure that includes an agent that is configured to establish a remote display protocol connection with a client terminal and a virtual bus driver that implements device redirection when a device is connected to the client terminal. The virtual bus driver is further configured to receive IRPs that are directed to the device and to share the IRPS to the client terminal. In response to receiving an IRP, the virtual bus driver: associates the IRP with a container and transitions a state of the container to indicate that the container is associated with the IRP but that the IRP has not yet been shared to the client terminal; shares the IRP to the client terminal and transitions the state of the container to indicate that the associated IRP has been shared but remains outstanding; and upon receiving notification from the client terminal that the IRP has been completed, determines the state of the container such that when the container is in the shared state, the virtual bus driver completes the IRP, whereas when the container is not in the shared state, the virtual bus driver prevents the IRP from completing.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIGS. 6A-6E illustrate an example of how a virtual bus driver can employ a container to manage an IRP that pertains to a device that is being redirected from a client terminal.

DETAILED DESCRIPTION

In this application, to simplify the description of the present invention and in the context of a redirected USB device, the term IRP will be used to represent both I/O request packets and their associated USB request blocks (URBs). In other words, a URB can be viewed as a sub-component of an IRP within this description. The term "container" should be construed as a data structure that is used to track the state of an IRP that pertains to a redirected device. The term "container pool" should be construed as a collection of such containers.

Figure 1:
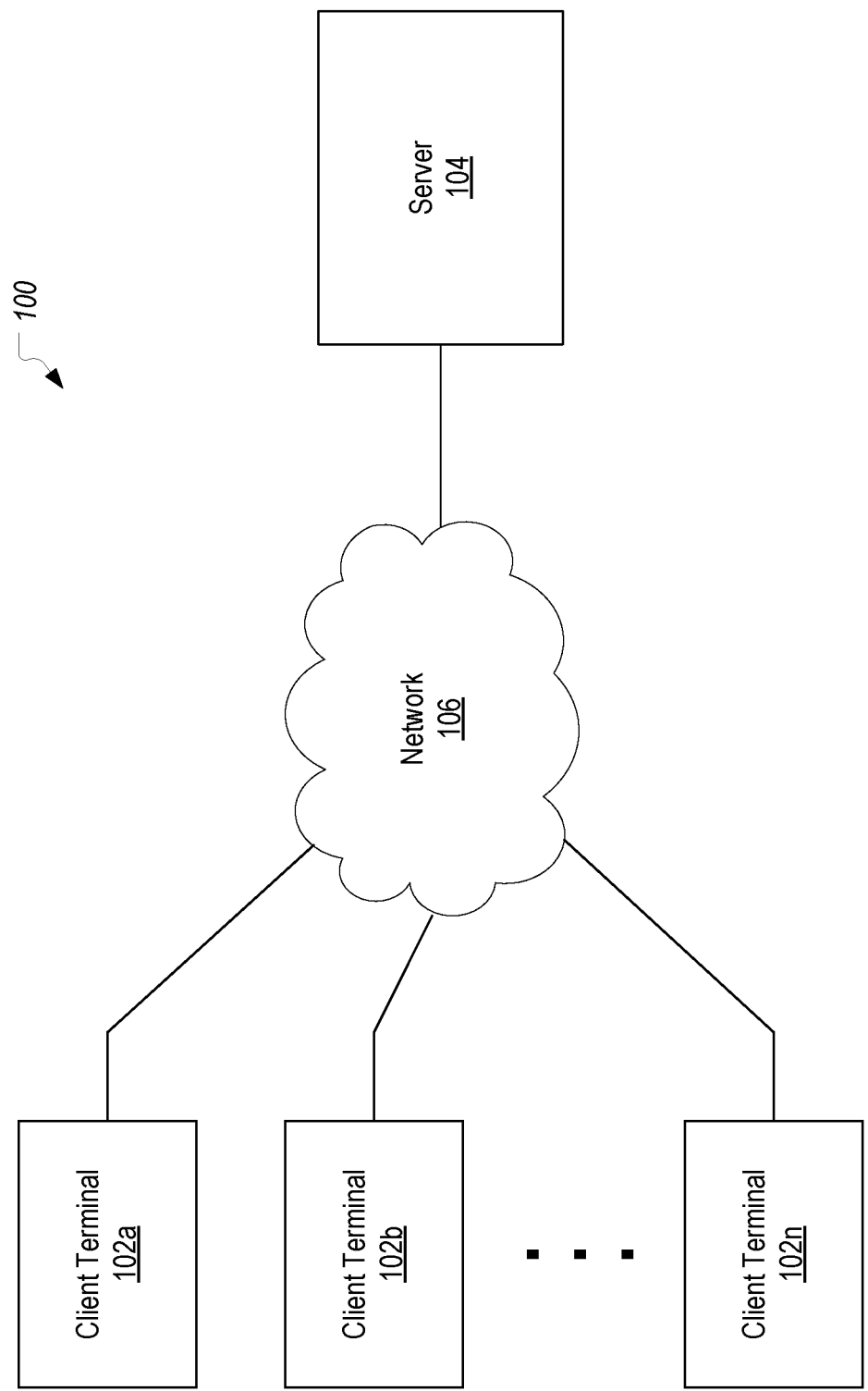
FIG. 1 illustrates an example computing environment in which the present invention can be implemented.
Figure 2:
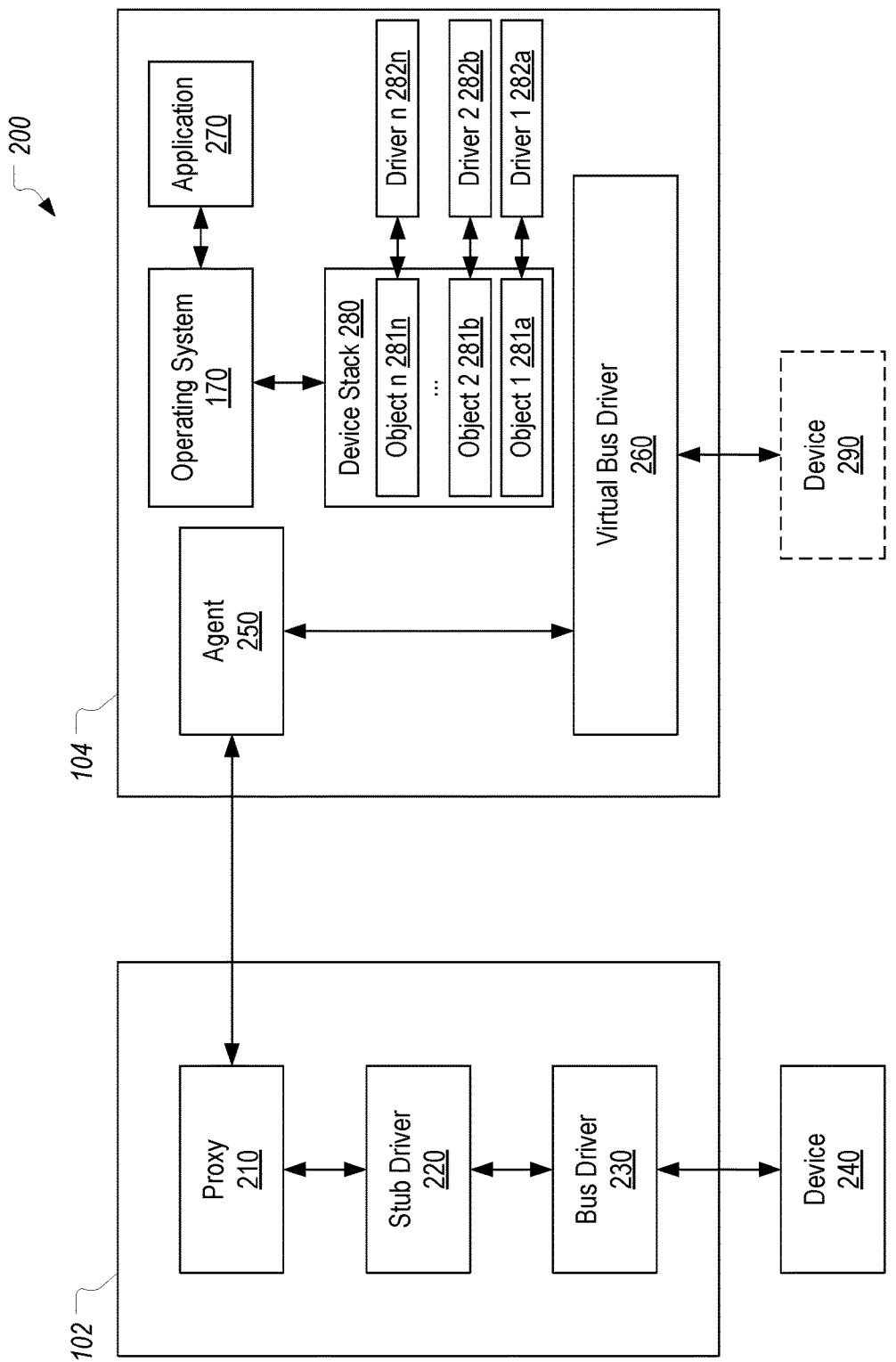
FIG. 2 illustrates how a USB device can be redirected from a client terminal to a server.
Figure 3:
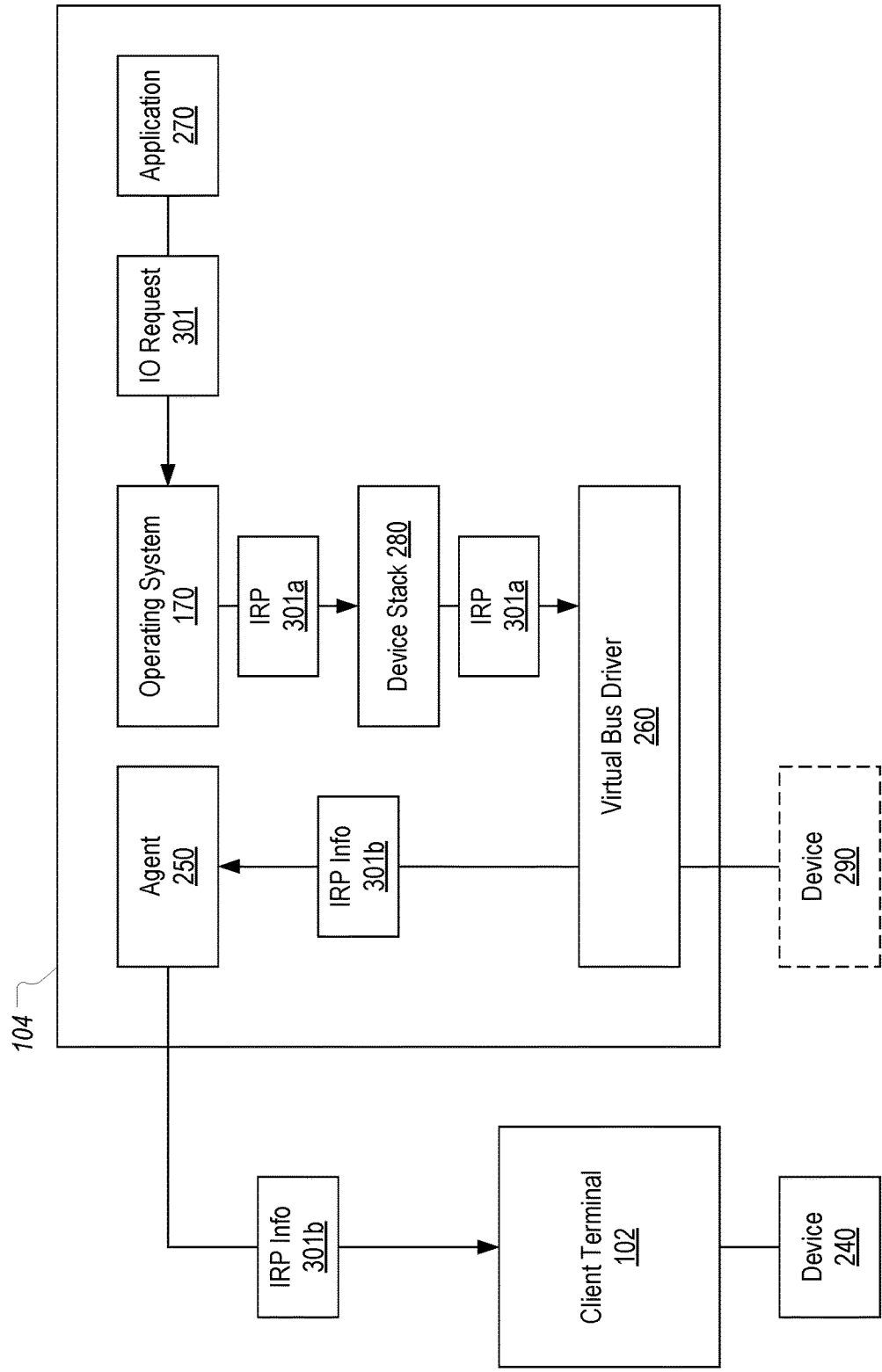
FIG. 3 illustrates how a virtual bus driver on a server can route IRPs to a client terminal that is redirecting a device to the server.
Figure 4:
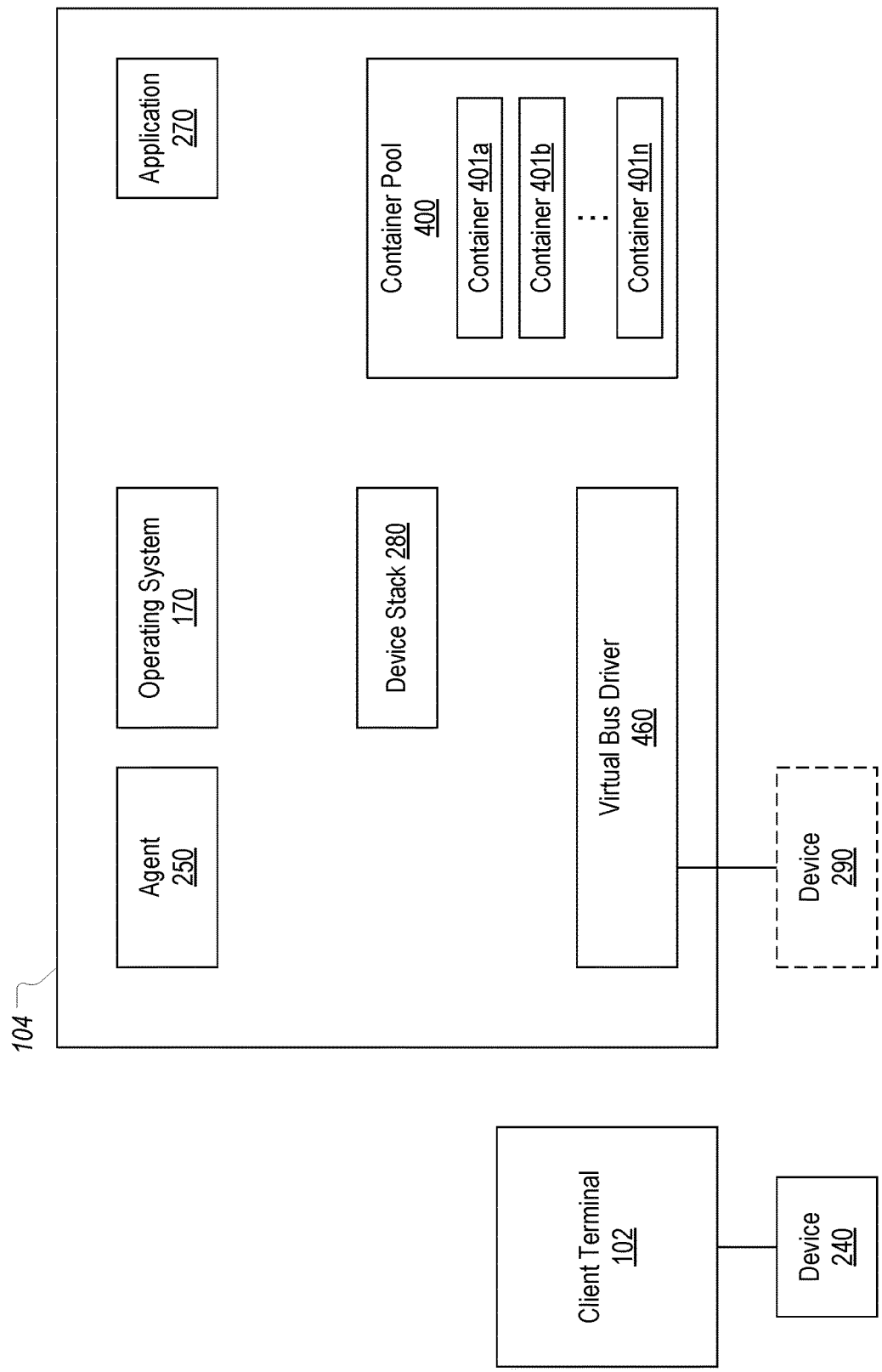
FIG. 4 illustrates an example architecture that can be employed to implement one or more embodiments of the present invention.

FIG. 4 illustrates an example architecture of server 104 that can be employed to implement embodiments of the present invention. FIG. 4 is the same as FIG. 3 with the exception of virtual bus driver 460 and container pool 400. Accordingly, the present invention can be implemented without requiring any client-side modifications or modifications to upper level drivers or other system components. Additionally, the present invention is agnostic to the remote display protocol that is employed between client terminal 102 and server 104.

Virtual bus driver 460 can employ container pool 400 to implement a state machine for managing IRPs that pertain to a redirected device such as device 240. As shown, container pool 400 includes a number of containers 401*a*-401*n* (where n represents some integer such as 100). Each of containers 401*a*-401*n* can be associated with a particular IRP at a particular time for the purpose of defining the state of the associated IRP. Based on the defined state of an IRP, virtual bus driver 460 can make decisions on how to handle the cancellation of IRPs.

Containers 401*a*-401*n* can be created when virtual bus driver 460 is initialized. Also, additional containers can be created on demand if necessary. Once created, containers 401*a*-401*n* are placed in container pool 400 which can function as a queue from which virtual bus driver 460 selects a container when an IRP is received for the purpose of managing the IRP while it is shared to the client.

Figure 4A:
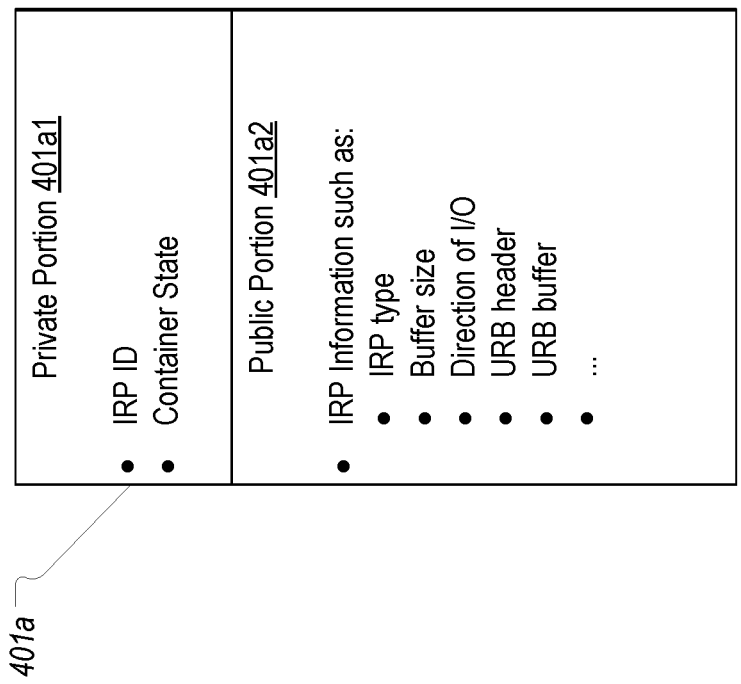
FIG. 4A illustrates an example of the contents of containers in a container pool used to manage IRPs that are routed to a client terminal.

Turning to FIG. 4A, an example of the contents of a container is shown. A container (e.g., container 401*a* as shown) can include a private portion 401*a*1 and a public portion 401*a*2. In this context, private refers to the content of the container that is not shared with the client while public refers to the content of the container that is shared. More specifically, private portion 401*a*1 constitutes the information that virtual bus driver 460 employs to manage the state of the IRP while public portion 401*a*2 constitutes the actual content of the IRP that is sent to the client. It is noted that the server-side IRP itself is not directly sent to the client since much of the contents of the IRP would be meaningless on the client (e.g., server-side pointers and buffer information is not valid on the client). In contrast, as is known in the art, virtual bus driver 460 can send sufficient content to allow stub driver 220 to recreate an equivalent IRP on the client side. As noted in FIG. 4A, this content (or IRP information) can typically include an indication of the type of the IRP, the IRP's buffer size, the direction of the I/O, the URB header, and the contents of the URB buffer.

Private portion 401*a*1 can include an identifier of an IRP (IRP ID) with which the container has been associated as well as a state of the container. In some embodiments, private portion 401*a*1 may also maintain a state history. The IRP identifier can be any suitable information that uniquely identifies an IRP. For example, in the Windows I/O model, IRPs are passed to drivers by providing a pointer to the IRP. Therefore, in some embodiments, the IRP identifier stored in a container can be the pointer to the IRP. When transmitting the IRP information of a particular IRP to client terminal 102, virtual bus driver 460 can include this IRP identifier in the communication to thereby allow the communication, and more importantly a response to the communication, to be identified as pertaining to a particular container. In short, each container will maintain the identifier of an IRP to allow virtual bus driver 460 to determine with which IRP the container is associated.

At any given time, each container 401a-401n can define one of various states including an uninitialized state (UN-INIT), an initialized state (INIT), and a shared state (SHARED). The uninitialized state represents that the container is not currently associated with an IRP. The initialized state represents that the container is currently associated with an IRP but that the IRP has not yet been shared with the client. The shared state represents that an IRP associated with the container has been shared with the client. A primary role of these containers is to provide a simplified way to properly handle the cancellation of an IRP that pertains to a redirected device as will be described in detail below.

Each container in container pool 400 can be in the uninitialized state. In other words, container pool 400 maintains each container that is currently available to be associated with an IRP. When virtual bus driver 460 receives an IRP, it can obtain a container from container pool 400 (e.g., when container pool 400 is implemented as a queue, by accessing the container at the front of the queue) and associate it with the IRP. After completion of the IRP, virtual bus driver 460 can then return the container to container pool (e.g., by placing it at the rear of the queue).

Figure 5:
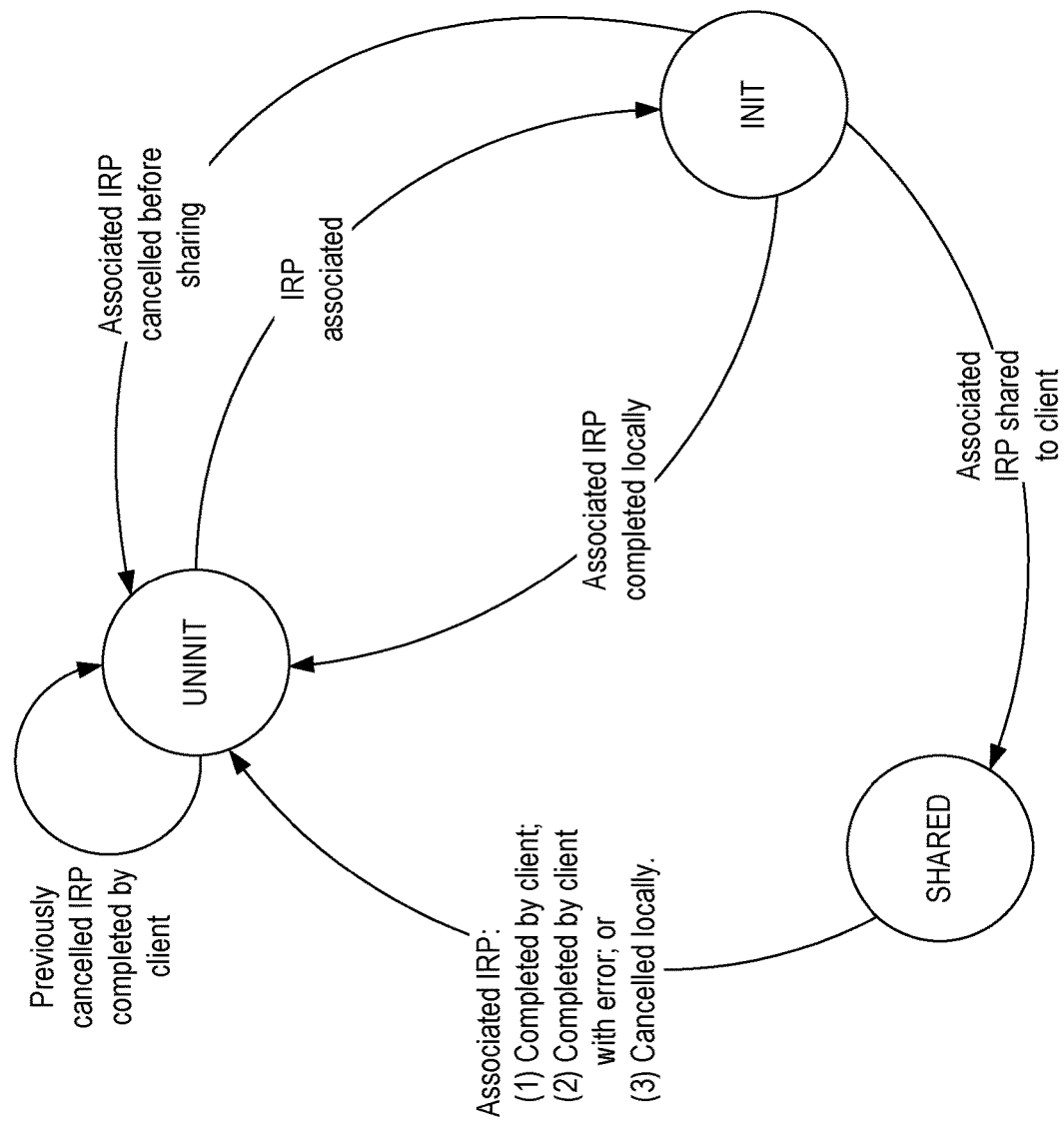
FIG. 5 provides a state diagram depicting the possible states of a container including how the container can transition between states.

FIG. 5 provides a state diagram defining how a container can transition between states. Prior to being associated with an IRP, a container will be in the uninitialized state. Then, when virtual bus driver 460 is passed an IRP that is directed towards a redirected device, it can select a container from container pool 400 and associate the IRP with that container. As described above, this association can be accomplished by storing an identifier of the IRP in the container and by transitioning the container into the initialized state (e.g., by changing the value of the state variable from UNINIT to INIT).

Not all IRPs received by virtual bus driver 460 will need to be shared to the client. For example, virtual bus driver 460 may be capable of completing the IRP locally without routing the IRP to the redirected device. Also, there may be instances where an IRP that should be shared to the client is cancelled before it is shared (e.g., when an upper level driver calls virtual bus driver 460's cancel routine). The container's initialize state can be employed to represent an IRP that is in this state. Accordingly, the state diagram of FIG. 5 shows that a container may transition from the initialize state back to the uninitialized state if the associated IRP has not yet been shared and has either been completed locally (e.g., by virtual bus driver 460) or cancelled.

Once virtual bus driver 460 shares an IRP to the client, it can transition the associated container to the shared state. The shared state represents that the associated IRP has been shared and remains outstanding. A container will transition from the shared state to the uninitialized state when the IRP is completed by the client (whether successfully or with an error) or when the IRP is cancelled locally (e.g., when virtual bus driver 460's cancel routine is called for the IRP).

Figure 6B:
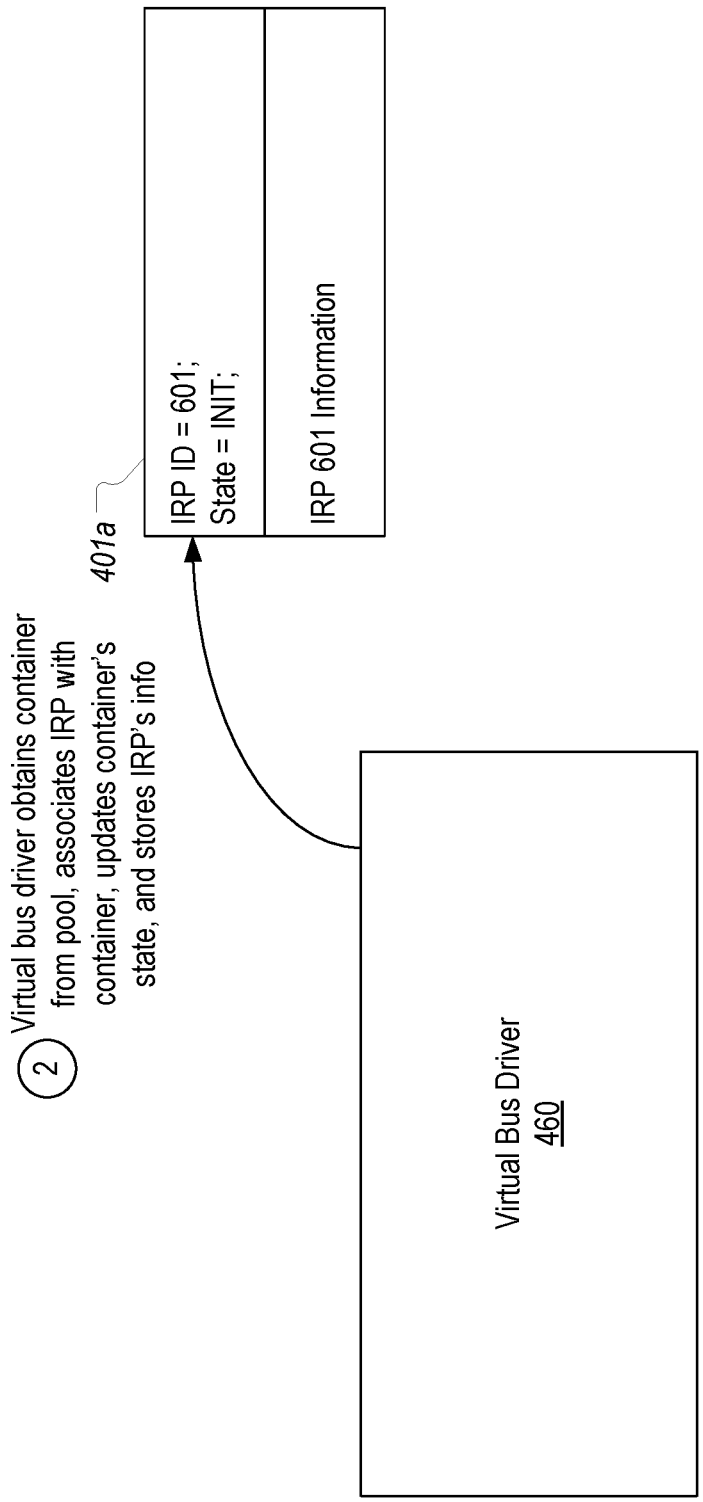

FIGS. 6A-6E illustrate an example of how virtual bus driver 460 can employ a container 401a to manage an IRP 601 that pertains to a device that is being redirected from client terminal 102. In FIG. 6A, in step 1, virtual bus driver 460 is passed an IRP 601. Prior to receiving IRP 601, and for simplicity, it will be assumed that container pool 400 includes three containers 401a, 401b, and 401c (each of which would be in the uninitialized state). For ease of illustration, only the private portion of these containers is depicted in FIG. 6A. However, it is to be understood that each container can include a public portion in which information about an associated IRP can be maintained.

In response to receiving IRP 601, in step 2 as shown in FIG. 6B, virtual bus driver 460 will obtain a container (e.g., container 401a) from container pool 400, associate it with IRP 601, and transition it to the initialized state. For simplicity, FIG. 6B shows that the IRP ID is set to 601 which may represent the pointer to IRP 601 or some other unique identifier of the IRP. Also, as mentioned above, virtual bus driver 460 can populate the public portion of container 401a with the information of IRP 601, which information virtual bus driver 460 can eventually send to client terminal 102 to allow stub driver 220 to create an IRP equivalent to IRP 601.

Figure 6C:
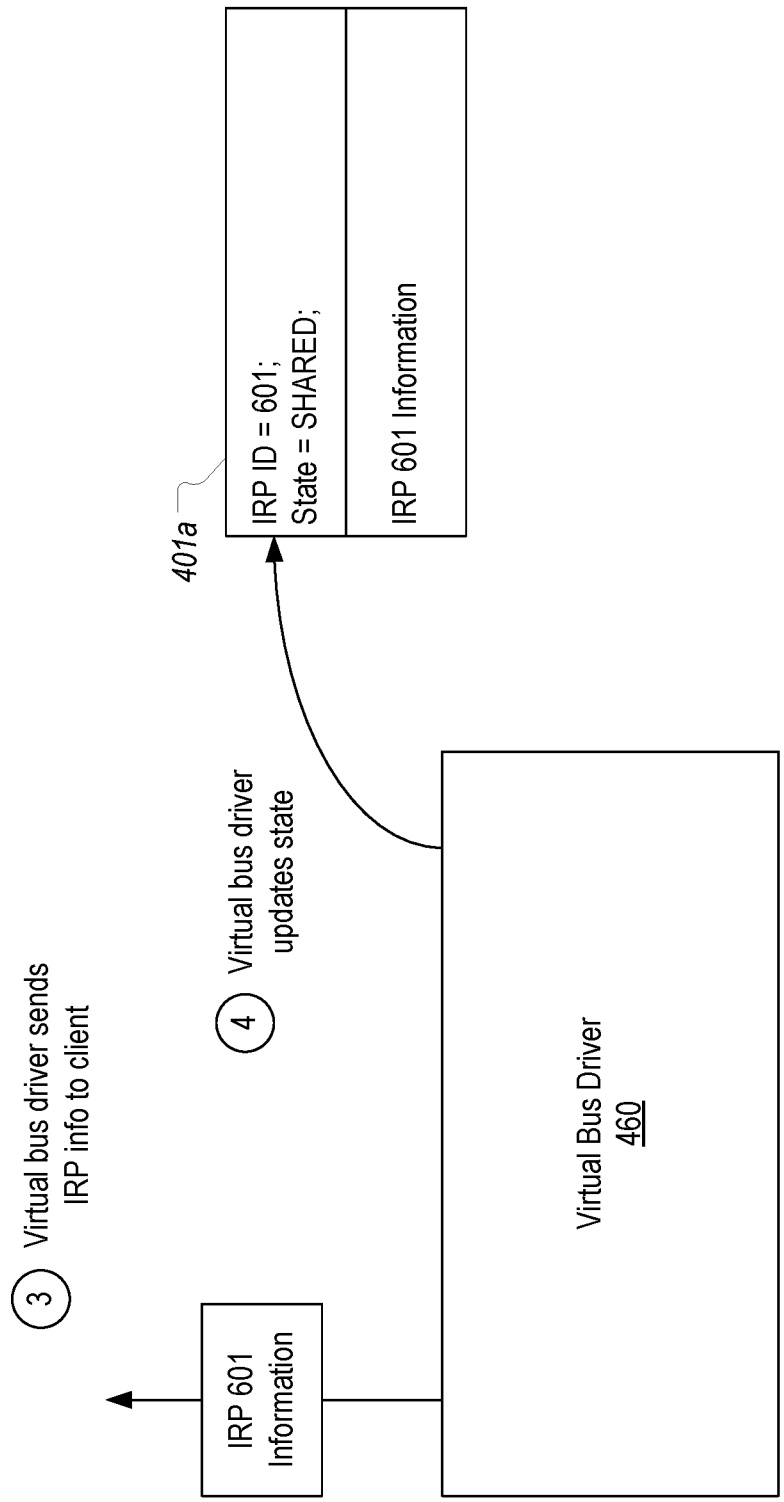

Once virtual bus driver 460 initializes container 401a, and assuming IRP 601 is not cancelled beforehand or completed locally, virtual bus driver 460 can share IRP 601 to client terminal 102 in step 3 as shown in FIG. 6C. As indicated above, this is accomplished by sending sufficient information about IRP 601 (e.g., the information contained in the public portion of container 401a) to allow stub driver 220 to create an equivalent client-side IRP. Also, in step 4, virtual bus driver 460 can transition container 401a to the shared state. In contrast, in accordance with the state diagram of FIG. 5, if IRP 601 was instead completed locally or cancelled prior to being shared, virtual bus driver 460 could instead transition container 401a back to the uninitialized state and return container 401a to container pool 400 so that it may be reused.

Figure 6D:
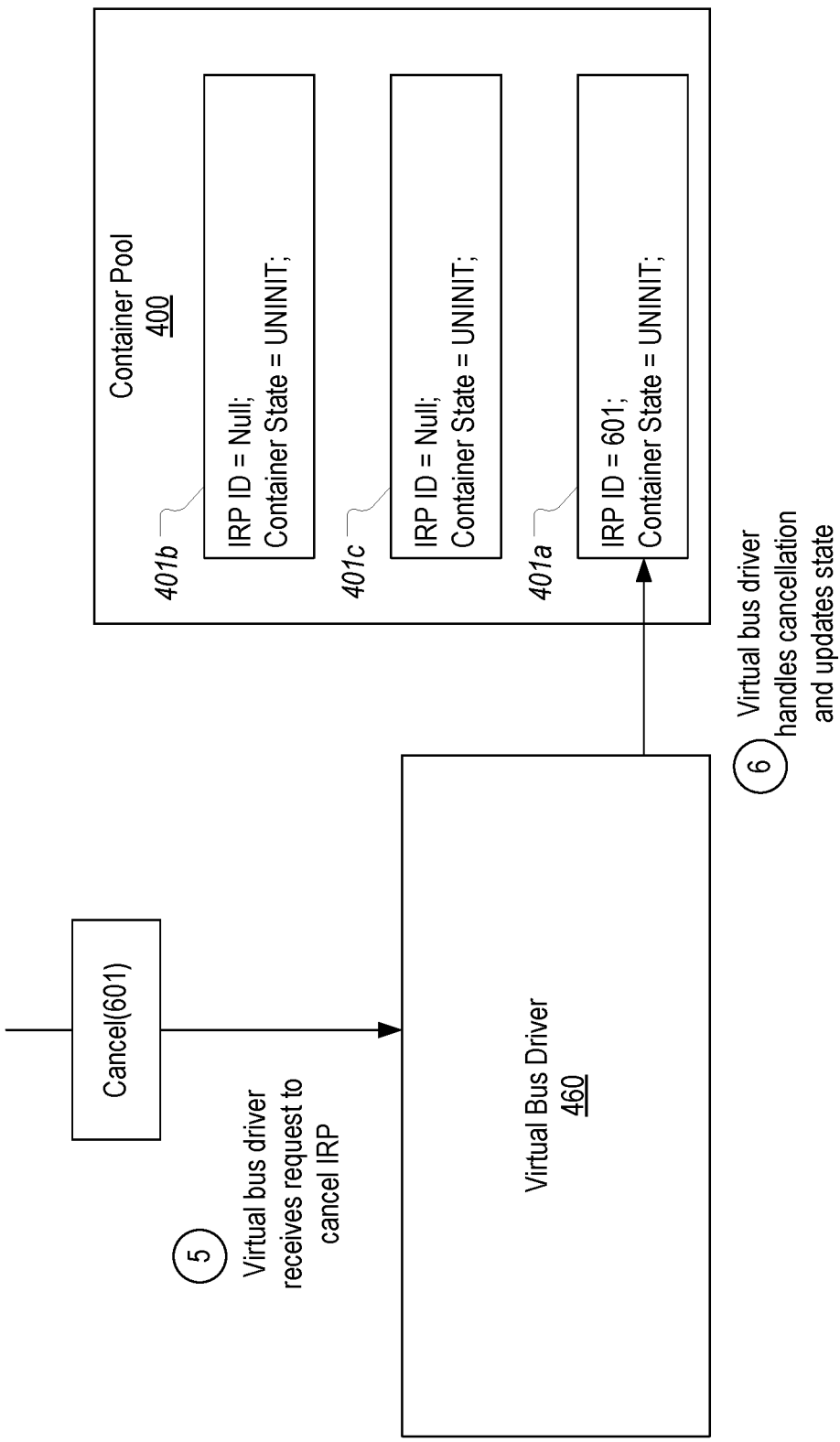

Next, FIG. 6D illustrates in step 5 that IRP 601 is cancelled after it has been sent to, but prior to receiving a response from, client terminal 102. For example, virtual bus driver 460's cancel routine may be called by a higher level driver or the system with a pointer to IRP 601. In response, virtual bus driver 460 can take appropriate steps to cancel IRP 601 on the server side. However, as addressed in the background, even though IRP 601 is cancelled on the server side, the corresponding IRP will remain outstanding on the client side which will likely result in virtual bus driver 460 receiving a response pertaining to IRP 601 after it has been canceled. In such a scenario, if virtual bus driver 460 were to attempt to complete IRP 601 after it has been cancelled, various problems could arise.

In order to prevent this type of double completion, when IRP 601 is cancelled, virtual bus driver 460 can transition the state of container 401a back to the uninitialized state and return container 401a to container pool 400 as represented in step 6. In this state, the client-side processing of IRP 601 may continue (since the client will not know that the IRP was cancelled). Therefore, at some later time, virtual bus driver 460 may receive the completed IRP from client terminal 601 (or more particularly, may receive the information necessary for virtual bus driver 460 to update the actual IRP 601 to reflect the results of the client-side completion of the IRP) as is represented in step 7. Whenever it receives a completed IRP from the client, virtual bus driver 460 can be configured to locate the container associated with the corresponding IRP. As mentioned above, this can be accomplished by including the actual IRP pointer or some other unique identifier in the communications between virtual bus driver 460 and the client so that, when a response is received from the client, virtual bus driver 460 can determine to which IRP (and to which container) the response pertains.

Figure 6E:
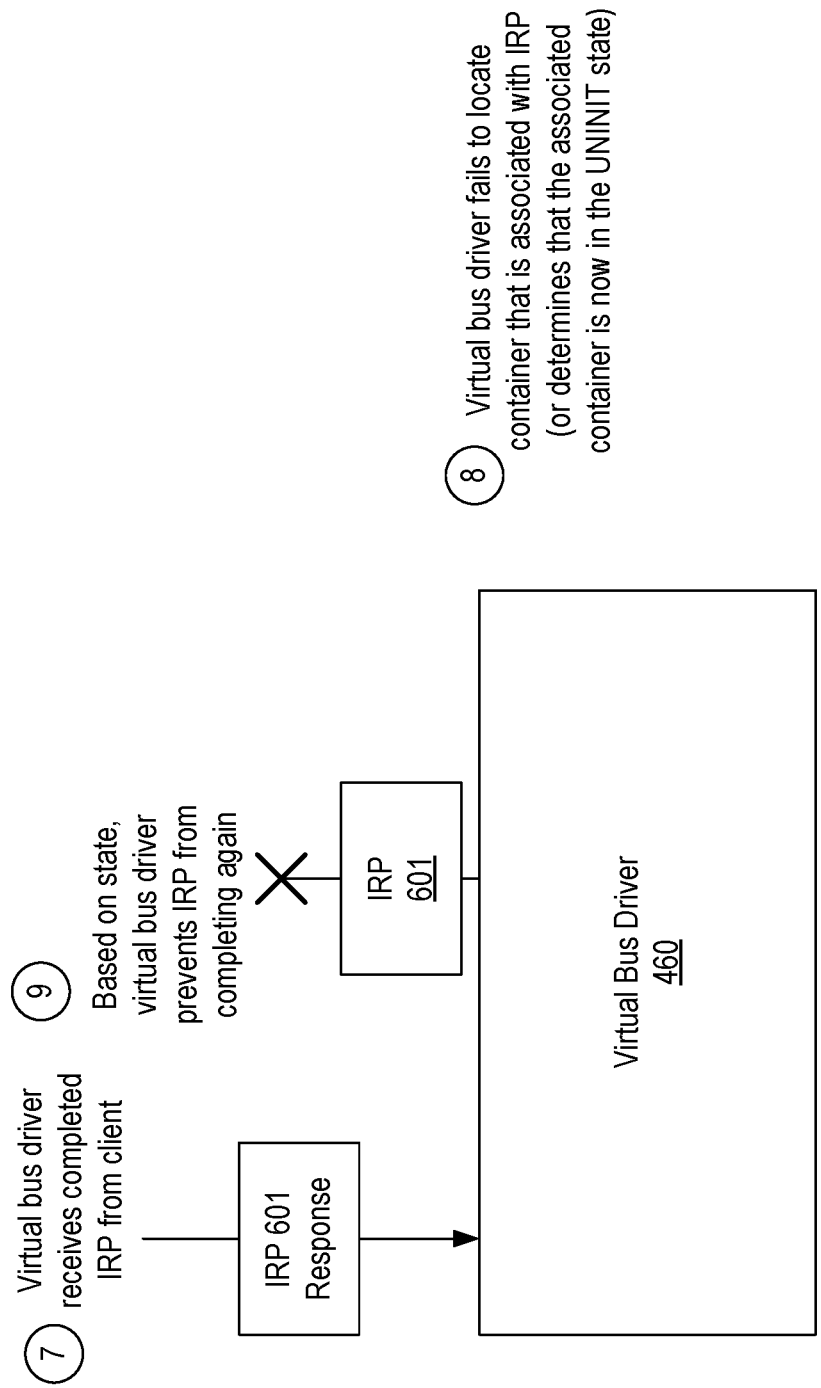

Although not depicted in FIG. 6E, at any given time, virtual bus driver 460 may be managing a number of containers that are in the initialized or shared state. Upon receiving a completed IRP from the client, virtual bus driver 460 can search these containers to determine whether a container (that is not in the uninitialized state) is associated with the completed IRP. In the present example, because IRP 601 was previously cancelled and container 401a was transitioned to the uninitialized state, virtual bus driver 460 will not locate a container in the shared state that is associated with IRP 601 as represented in step 8. Therefore, in step 9, virtual bus driver 460 can prevent IRP 601 from again being completed. In essence, virtual bus driver 460 can forego any further processing of the response it received from the client.

In contrast, if IRP 601 had not been cancelled, container 401a would have still been in the shared state resulting in virtual bus driver 460 locating a matching container. Therefore, in this alternate scenario, virtual bus driver 460 could have completed IRP 601 based on the response it received from the client and returned container 401a to container pool 400 after transitioning its state back to uninitialized.

As can be seen, this state machine approach to managing shared IRPs provides a simple and efficient way to prevent a shared IRP from being completed twice. Once an IRP has been shared to the client, virtual bus driver 460 will only complete the IRP if its associated container is in the shared state when the client (i.e., stub driver 220) returns its corresponding response. This determination can be carried out quickly with minimal overhead.

Although the above description depicts a scenario in which virtual bus driver 460 searches through containers that are not in the uninitialized state to determine whether an IRP completed by the client has been previously cancelled, the same result could be reached by searching through all containers including those in the uninitialized state. In particular, in place of (or in addition to) step 8, virtual bus driver 460 could search through container pool 400 until locating the container that includes the identifier of IRP 601 (i.e., virtual bus driver 460 may locate container 401a). In this scenario, virtual bus driver 460 can determine that the associated container is in the uninitialized state and that therefore IRP 601 should not again be completed. Accordingly, the exact manner in which containers are moved to or from or within container pool 400 as well as the exact manner in which virtual bus driver 460 accesses containers when a client completes an IRP are not essential to the invention. Any technique can be employed by virtual bus driver 460 to determine whether the container that was associated with a particular IRP is still in the shared state when the client completes the particular IRP.

The present invention provides significant performance improvements in high-latency network environments. When a device is redirected over a high-latency network, the inherent delay in the network may result in the cancellation of many IRPs, especially when the device is of a type that requires cancellation after the IRP has remained outstanding for a specified amount of time. The efficient manner in which the present invention can address these types of IRP cancellations allows many devices, particularly those that were previously not recommended for redirection, to be available for redirection without the concerns of crashing the server or otherwise hindering its performance.

Figure 7:
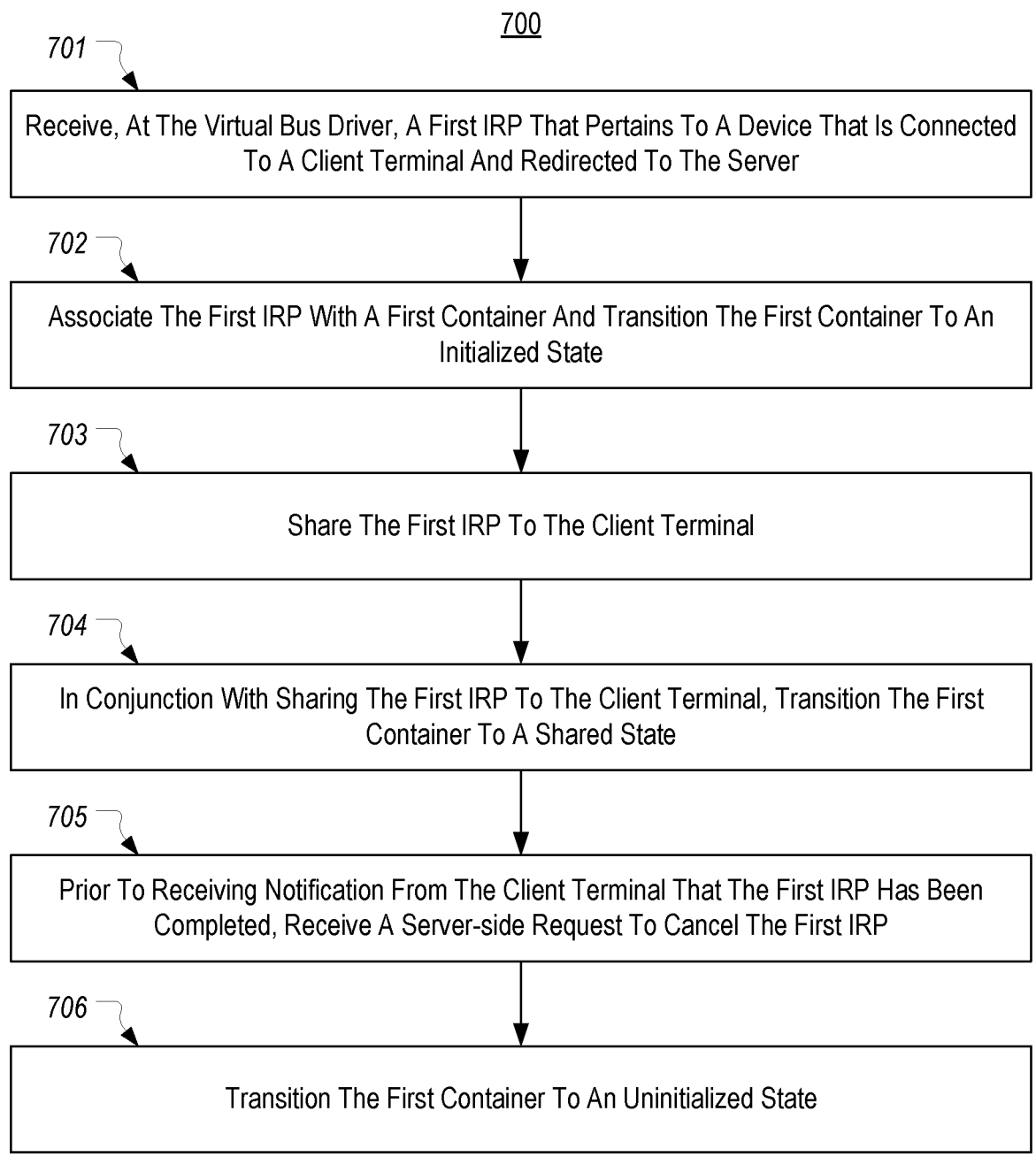
FIG. 7 illustrates a flowchart of an example method for managing IRPs that pertain to a device that is redirected to the server.

FIG. 7 provides a flowchart of an example method 700 for managing IRPs that pertain to a device that is redirected to the server. Method 700 can be implemented by virtual bus driver 460.

Method 700 includes an act 701 of receiving, at the virtual bus driver, a first IRP that pertains to a device that is connected to a client terminal and redirected to the server. For example, virtual bus driver 460 can receive IRP 601.

Method 700 includes an act 702 of associating the first IRP with a first container and transitioning the first container to an initialized state. For example, virtual bus driver 460 can associate IRP 601 with container 401a.

Method 700 includes an act 703 of sharing the first IRP to the client terminal. For example, virtual bus driver 460 can send sufficient information about IRP 601 to stub driver 220 to allow stub driver 220 to create an equivalent IRP on client terminal 102.

Method 700 includes an act 704 of, in conjunction with sharing the first IRP to the client terminal, transitioning the first container to a shared state. For example, virtual bus driver 460 can transition container 401a to the shared state.

Method 700 includes an act 705 of prior to receiving notification from the client terminal that the first IRP has been completed, receiving a server-side request to cancel the first IRP. For example, a cancel routine of virtual bus driver 460 can be called for IRP 601.

Method 700 includes an act 706 of transitioning the first container to an uninitialized state. For example, virtual bus driver 460 can transition container 401a to an uninitialized state.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by a virtual bus driver executing on a server in a virtual desktop infrastructure environment, for managing I/O request packets (IRPs) that pertain to a device that is connected to a client terminal and redirected to the server, the method comprising:
maintaining a first container that has a state that can be set to a plurality of values including an uninitialized value, an initialized value and a shared value;
receiving, at the virtual bus driver, a first IRP that pertains to the device that is connected to the client terminal and redirected to the server;
in response to receiving the first IRP, associating the first IRP with the first container;
in conjunction with associating the first IRP with the first container, setting the state of the first container to the initialized value;
sharing the first IRP to the client terminal;
in conjunction with sharing the first IRP to the client terminal, setting the state of the first container to the shared value;
after sharing the first IRP to the client terminal but prior to receiving notification from the client terminal that the first IRP has been completed on the client terminal, receiving a server-side request to cancel the first IRP;
while the first IRP is shared to the client terminal, completing the first IRP by cancelling the first IRP on the server;
in conjunction with cancelling the first IRP and while the first IRP is shared to the client terminal, changing the state of the first container from the shared value to the uninitialized value such that the state of the first container is set to the uninitialized value while the first IRP is shared to the client terminal;
after completing the first IRP by cancelling the first IRP on the server and changing the state of the first container to the uninitialized value, receiving notification from the client terminal that the first IRP has been completed on the client terminal even though the first IRP has been completed on the server;
determining that the state of the first container is set to the uninitialized value; and
in response to determining that the state of the first container is set to the uninitialized value, preventing the first IRP from being completed again on the server.

2. The method of claim 1, wherein determining that the state of the first container is set to the uninitialized value comprises one or both of:
determining that the state of the first container is no longer set to the shared value; or
determining that the state of the first container is currently set to the uninitialized value.

3. The method of 1, wherein associating the first IRP with a first container comprises obtaining the first container from a container pool, and wherein changing the state of the first container to the uninitialized value comprises returning the first container to the container pool.

4. The method of claim 1, wherein the state of the first container is set to the initialized value from the uninitialized value as part of associating the first IRP with the first container.

5. The method of claim 1, wherein associating the first IRP with the first container comprises storing a pointer to the first IRP in the first container.

6. The method of claim 1, wherein sharing the first IRP to the client terminal comprises sending information of the first IRP to a stub driver on the client terminal to allow the stub driver to create, from the information, an equivalent IRP on the client terminal.

7. The method of claim 6, wherein the first IRP is shared to the client terminal over a remote display protocol connection.

8. The method of claim 1, further comprising:
maintaining a second container that has a state that can be set to the plurality of values;
receiving a second IRP that pertains to the device;
in response to receiving the second IRP, associating the second IRP with the second container;
in conjunction with associating the second IRP with the second container, setting the state of the second container to the initialized value;
prior to sharing the second IRP to the client terminal, receiving a server-side request to cancel the second IRP; and
setting the state of the second container to the uninitialized value.

9. The method of claim 1, further comprising:
maintaining a second container that has a state that can be set to the plurality of values;
receiving a second IRP that pertains to the device;
in response to receiving the second IRP, associating the second IRP with the second container;
in conjunction with associating the second IRP with the second container, setting the state of the second container to the initialized value;
sharing the second IRP to the client terminal;
in conjunction with sharing the second IRP to the client terminal, setting the state of the second container to the shared value;
receiving notification from the client terminal that the second IRP has been completed;
determining that the state of the second container is set to the shared value; and
completing the second IRP on the server.

10. The method of claim 9, further comprising:
in conjunction with completing the second IRP on the server, setting the state of the second container to the uninitialized value.

11. One or more non-transitory computer storage media storing computer executable instructions which when executed on a server in a virtual desktop infrastructure environment implement a virtual bus driver that performs a method for managing I/O request packets (IRPs) that pertain to a device that is connected to a client terminal and redirected to the server, the method comprising:
maintaining a first container that has a state that can be set to a plurality of values including an uninitialized value, an initialized value and a shared value;
receiving, at the virtual bus driver, a first IRP that pertains to the device that is connected to the client terminal and redirected to the server;

in response to receiving the first IRP, associating the first IRP with the first container;
in conjunction with associating the first IRP with the first container, setting the state of the first container to the initialized value;
sharing the first IRP to the client terminal;
in conjunction with sharing the first IRP to the client terminal, setting the state of the first container to the shared value;
after sharing the first IRP to the client terminal but prior to receiving notification from the client terminal that the first IRP has been completed on the client terminal, receiving a server-side request to cancel the first IRP;
while the first IRP is shared to the client terminal, completing the first IRP by cancelling the first IRP on the server;
in conjunction with cancelling the first IRP and while the first IRP is shared to the client terminal, changing the state of the first container from the shared value to the uninitialized value such that the state of the first container is set to the uninitialized value while the first IRP is shared to the client terminal;
after completing the first IRP by cancelling the first IRP on the server and changing the state of the first container to the uninitialized value, receiving notification from the client terminal that the first IRP has been completed on the client terminal even though the first IRP has been completed on the server;
determining that the state of the first container is set to the uninitialized value; and
in response to determining that the state of the first container is set to the uninitialized value, preventing the first IRP from being completed again on the server.

12. The computer storage media of claim 11, wherein determining that the state of the first container is set to the uninitialized value comprises one or both of:
determining that the state of the first container is no longer set to the shared value; or
determining that the state of the first container is currently set to the uninitialized value.

13. The computer storage media of claim 11, wherein associating the first IRP with a first container comprises obtaining the first container from a container pool, and wherein changing the state of the first container to the uninitialized value comprises returning the first container to the container pool.

14. The computer storage media of claim 11, wherein the state of the first container is set to the initialized value from the uninitialized value as part of associating the first IRP with the first container.

15. The computer storage media of claim 11, wherein associating the first IRP with the first container comprises storing a pointer to the first IRP in the first container.

16. The computer storage media of claim 11, wherein sharing the first IRP to the client terminal comprises sending information of the first IRP to a stub driver on the client terminal to allow the stub driver to create, from the information, an equivalent IRP on the client terminal.

17. The computer storage media of claim 16, wherein the first IRP is shared to the client terminal over a remote display protocol connection.

18. The computer storage media of claim 11, wherein the method further comprises:
maintaining a second container that has a state that can be set to the plurality of values;
receiving a second IRP that pertains to the device;
in response to receiving the second IRP, associating the second IRP with the second container;
in conjunction with associating the second IRP with the second container, setting the state of the second container to the initialized value;
prior to sharing the second IRP to the client terminal, receiving a server-side request to cancel the second IRP; and
setting the state of the second container to the uninitialized value.

19. The computer storage media of claim 11, wherein the method further comprises:
maintaining a second container that has a state that can be set to the plurality of values;
receiving a second IRP that pertains to the device;
in response to receiving the second IRP, associating the second IRP with the second container;
in conjunction with associating the second IRP with the second container, setting the state of the second container to the initialized value;
sharing the second IRP to the client terminal;
in conjunction with sharing the second IRP to the client terminal, setting the state of the second container to the shared value;
receiving notification from the client terminal that the second IRP has been completed;
determining that the state of the second container is set to the shared value; and
completing the second IRP on the server.

20. The computer storage media of claim 19, wherein the method further comprises:
in conjunction with completing the second IRP on the server, setting the state of the second container to the uninitialized value.

* * * * *